Patented Nov. 18, 1947

2,430,859

UNITED STATES PATENT OFFICE 2,430,859

SULFUR CONTAINING POLYAMIDES

Theodore Le Sueur Cairns, Wilmington, Del., assignor to E. I. du Pont de Nemours & Company, Wilmington, Del., a corporation of Delaware No Drawing. Application January 11, 1944,
Serial No. 517,900

4 Claims. (Cl. 260—78)

This invention relates to the field of synthetic polyamides of the nylon type and more particularly to derivatives having extralinearly attached to the carbonamide nitrogen, mercaptomethyl or the corresponding disulfide groups.

High molecular weight synthetic linear polyamides are a well known class of polymers of considerable commercial importance. These polyamides are usually prepared by the condensation of substantially equal molecular amounts of a diamine and a dibasic acid, or of an amino acid or mixtures of these compounds as has been described in United States Patents 2,071,250, 2,071,253 and 2,130,948. The polyamides of this kind have an intrinsic viscosity of at least 0.4 as defined in the last mentioned patent, and comprise the reaction product of a polymer-forming composition containing amide-forming groups, for example, as formed by reacting material consisting essentially of bifunctional molecules each of which contains two reactive groups which are complementary to reactive amide-forming groups in other molecules. In addition to the use of monoamino-monocarboxylic acids, a diamine with a dibasic carboxylic acid or a monoaminomonohydric alcohol with a dibasic carboxylic acid, or the amide-forming derivatives of each, or mixtures of these or other similar compounds may also be used to obtain the synthetic linear polyamides. In these polyamides the average number of carbon atoms in the segments of the chain separating the amide groups is at least two. The polyamides may also have minor amounts of ester groups present.

A novel class of nitrogen-substituted polyamides having alkoxymethyl groups attached to the carbonamide nitrogen can be readily prepared by the treatment of the polyamide with formaldehyde and an alcohol in the presence of an oxygen-containing acid. These polymers are soluble in organic solvents such as alcohol and are thus useful in many applications where the substantially insoluble synthetic linear polyamide cannot readily be employed. The N-alkoxymethyl polyamide obtained from the synthetic linear polyamides by treatment with formaldehyde and an alcohol in the presence of an oxygen-containing acid as catalyst has been further described in my copending application Serial No. 445,635 filed June 3, 1942. In this reaction the hydrogen of the hydrogen bearing carbonamide group of the synthetic linear polyamide is replaced by a group —CH$_2$OR in which R is a hydrocarbon radical, such as for example, methyl.

This invention has as an object the preparation of polyamides having improved properties. A further object is the preparation of polyamides in which the hydrogen of a carbonamide group is replaced by a sulfur-containing radical which is further chemically reactive. A still further object is the production of new and useful polymeric materials, such as films, fibers, etc. Further objects will appear hereinafter.

The above objects are accomplished through the production by methods hereinafter described of a new class of nitrogen-substituted synthetic polyamides having extralinearly attached to the carbonamide groups mercaptomethyl groups which can further be transformed into the corresponding disulfides from a plurality of the N-mercaptomethyl polyamide molecules.

The N-mercaptomethyl polyamides can be prepared in accordance with this invention by the reaction of an N-alkoxy-methyl polyamide or N-methylol polyamide with a suitable sulfur containing compound, such as for example, thiourea, followed by treatment of the resulting compound with alkali. The N-mercaptomethyl polyamides, like the polyamides from which they are derived, are of macromolecular weight. The N-mercaptomethyl polyamide can be obtained as a metal salt or as the free N-mercaptomethyl polyamide. Either can be subsequently converted into the corresponding disulfide by mild oxidation. Other transformations of the mercapto or disulfide linkages can be made.

One procedure for carrying out the invention is to treat a solution of an N-alkoxymethyl polyamide such as N-methoxy-methyl polyhexamethylene adipamide with thiourea in an alcoholic solution with the addition of a mineral acid. This reaction product is then treated with a base such as an alkali metal hydroxide in an alcoholic solution to give the corresponding N-mercaptomethyl polyamide or if an excess of the base is used, the corresponding metal salt of the N-mercaptomethyl polyamide is formed. The inorganic salt formed from the reaction of the base and the mineral acid is usually removed by filtration from the solution of the N-mercaptomethyl polyamide. The employment of an excess of the base thus gives rise to the corresponding salt of the N-mercaptomethyl polyamide from which the N-mercaptomethyl polyamide itself can be readily obtained by neutralization of its salt. Clear, rubbery films can be readily obtained by coagulating a solution of the N-mercaptomethyl polyamide such as by treatment with an aqueous solution of a salt, for example, sodium sulfate, to which a small amount of an oxidizing agent is added.

The following example, in which the parts given are by weight, further illustrates the practice of the invention.

The N - methoxymethyl polyhexamethylene adipamide used was obtained by heating polyhexamethylene adipamide, formaldehyde and methanol in the presence of phosphoric acid. A clear solution of 60 parts of the N-methoxymethyl polyamide and 18 parts of thiourea in 200 parts of methanol was prepared by stirring at 65° C. The resulting solution was then cooled to approximately 25° C. and 24 parts of concentrated hydrochloric acid in 20 parts of methanol was added with stirring. After 15 minutes at room temperature, this solution was poured into a solution prepared by dissolving 30 parts of potassium hydroxide in 120 parts of methanol. The resulting mixture was heated to the boiling point, then filtered through a viscose filter dressing with a diatomaceous earth filter aid to remove the precipitate of potassium chloride. Acetone was gradually added to the clear yellow solution and the polymer precipitated in a granular form. After filtration of the polymeric material, the acetone was removed in a stream of nitrogen at 60° C. A portion of the resulting product (35 parts) was dissolved in 65 parts of approximately 50% aqueous ethanol at 65° C. to give a clear yellow viscous solution of the potassium salt of the N-mercaptomethyl polyamide.

Films were prepared from the clear viscous solution by coagulating in a bath consisting of 960 parts of sodium sulfate, approximately 120 parts of 30% hydrogen peroxide, and 4000 parts of water. These films were prepared by first casting from the viscous solution onto a glass plate, followed by transferring this plate and film to the coagulating bath for 3 to 5 minutes, placing in a dilute aqueous acetic acid solution having a pH of about 2 for 30 minutes and washing in running water for an additional 30 minutes. The films were dried on a supporting ring at 100° C. for 15 minutes and the resulting material, which was sensitive to moisture and humidity changes, was clear and quite rubbery. A stiffer and more brittle film was obtained by further baking or desiccation of this product. The dried film upon analysis was found to contain 5.38% sulfur, 10.88% nitrogen, and 1.14% methoxyl. The original N-methoxymethyl polyamide contained no sulfur and 7.21% methoxyl.

Other metal salts than the alkali metal salt can be prepared from the N-mercaptomethyl polyamides or from a suitable alkali metal salt such as the potassium or sodium salt of the N-mercaptomethyl polyamide. Of especial interest is the lead salt which can be obtained by treatment of the N-mercaptomethyl polyamide or its alkali metal salt with a soluble lead compound. The lead salt of the N-mercaptomethyl polyamide has limited solubility and is useful to provide a means of purification of the substituted polyamide by precipitation of the polymers.

To aid in the understanding of the reactions involved in this invention, the following equations are believed to schematically represent the major reactions involved:

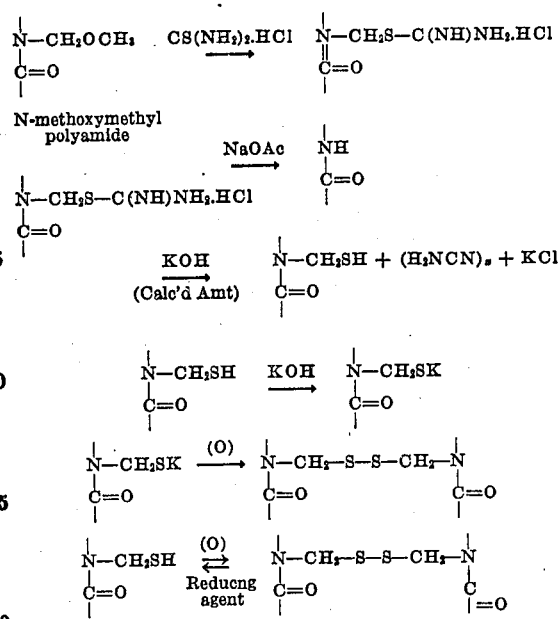

In the above diagram the cross-linked disulfide, obtained as indicated in the final formula by mild oxidation or by oxidation in air, is formed from a plurality of molecules of the N-mercaptomethyl polyamide. The disulfide can be reduced to the soluble thiol derivative by the use of reducing agents such as ethyl thioglycolate, thiosorbitol, hydrogen sulfide, or similar materials. Treatment of the disulfide with sodium sulfide also converts it into a water and alcohol soluble polymeric material.

As described in the above example, the cross-linked polyamide which contains disulfide linkages can be prepared from a solution of the N-mercaptomethyl polyamide in the form of films. Fibers can be formed by a technique which is in general similar to that used for the preparation of the films. Thus, fibers can be obtained by extruding a solution of the N-mercaptomethyl polyamide into a coagulating bath through a spinneret. These fibers can be treated by passage through a series of baths of the type described in the example with subsequent heating or baking operations to effect further insolubilization.

In addition to the method previously described for the production of N-mercaptomethyl polyamides by the use of thiourea, other methods can also be employed. These include the use of thioacetic acid with N-alkoxymethyl polyamide to give a polymer having attached to the nitrogen an extralinear acetyl thiomethyl group from which the mercaptomethyl can be formed by treatment with alkali.

Reaction materials other than those previously mentioned can be used. Thus, in place of the N-methoxymethyl polyhexamethylene adipamide, other N-alkoxymethyl polyamides can be used including N - ethoxymethyl polyhexamethylene adipamide, N-methoxymethyl polyhexamethylene sebacamide, or other N-alkoxy-methyl polyamides including those derived from interpolyamides or polyester-amides. Usually in the preparation of the N-alkoxymethyl polyamide, there are formed small amounts of N-methylol groups. N-methylol polyamides and N-alkoxymethyl polyamides which contain N-methylol groups are also useful as starting materials for the preparation of the N-mercaptomethyl polyamides.

The reaction is carried out to the greatest advantage in solution. Suitable solvents for the reaction include alcohols or mixtures of alcohols with chloroform or aromatic hydrocarbons. However, the reaction can be effected by immersing fibers, films and the like of polyamides which have a substantial amount of N-alkoxymethyl groups in a thiourea solution followed by suitable treatment as described in the example to produce the N-mercaptomethyl polyamide or conversion products such as the corresponding disulfide. The reaction can be carried out at temperatures of 0° to 70° C.

The N-mercaptomethyl polyamides of this invention are much more soluble in aqueous or alcoholic solutions than simple polyamides and accordingly the solutions can advantageously be used in the preparation of films, fibers, etc., with conversion to the insoluble cross-linked forms. It is thus readily apparent that these materials differ from the simple polyamides or the N-alkoxymethyl polyamides in solubility, formation into suitable products, and conversion into insoluble, infusible materials by the use of mild oxidizing agents, such as for example, air or peroxides such as hydrogen peroxide. A further property of the products of this invention is that these sulfur-containing substituted amide groups can be converted into other oxidation products, such as for example, into sulfoxides, sulfones, etc.

The sulfur-containing polyamides of this invention can be used in the preparation of fibers, films, coatings, adhesives, etc. The water sensitive derivatives obtained from the N-mercaptomethyl polyamides which are not subjected to prolonged oxidation or heat treatment may be used where permeability to aqueous solutions is needed, such as for example, in the preparation of photographic emulsions or water sensitive films. The fibers, films, etc., are especially useful where elastic properties are desired, for example, in fabrics. In general the oxidized materials exhibit elastic properties. In addition, although the oxidized disulfide compounds are practically infusible, they have sufficient plastic flow at elevated temperatures and high pressures so that they can be molded into homogeneous products.

As many apparently widely different embodiments of this invention may be made without departing from the spirit and scope thereof, it is to be understood that I do not limit myself to the specific embodiments thereof except as defined in the appended claims.

I claim:

1. A synthetic polycarbonamide having intralinear carbonamide groups which have extralinearly substituted for hydrogen of carbonamide nitrogen a substituent selected from the class consisting of —CH$_2$SH and —CH$_2$SSCH$_2$—, the carbon atoms of said last mentioned substituent being attached to nitrogen atoms of polycarbonamide groups, said polycarbonamide being macromolecular and having an average number of carbon atoms of at least two in the segments of the chain separating the amide groups.

2. A process of obtaining an N-mercaptomethyl polycarbonamide which comprises reacting an N-alkoxymethyl polycarbonamide having intralinear carbonamide groups with thiourea and a mineral acid, and adding the resulting product to a solution of alkali metal hydroxide, said N-alkoxymethyl polycarbonamide having an average number of carbon atoms of at least two in the segments of the chain separating the amide groups.

3. A process which comprises reacting an N-alkoxymethyl polycarbonamide having intralinear carbonamide groups with thiourea and a mineral acid and adding the resulting product to a solution of an alkali metal hydroxide and oxidizing the resulting N-mercaptomethyl polycarbonamide with an oxidizing agent, said N-alkoxymethyl polycarbonamide having an average number of carbon atoms of at least two in the segments of the chain separating the amide groups.

4. A mercaptomethyl polycarbonamide having intralinear carbonamide groups to the nitrogen atom of which is extralinearly attached a mercaptomethyl group, said polycarbonamide having an average number of carbon atoms of at least two in the segments of the chain separating the amide groups.

THEODORE LE SUEUR CAIRNS.

REFERENCES CITED

The following references are of record in the file of this patent:

UNITED STATES PATENTS

| Number | Name | Date |
|---|---|---|
| 2,244,184 | Austin et al. | June 3, 1941 |